United States Patent
Hardin et al.

(10) Patent No.: US 12,119,873 B2
(45) Date of Patent: Oct. 15, 2024

(54) SYSTEM AND METHOD FOR DETERMINING ACTIONS OF A VEHICLE BY VISIBLE LIGHT COMMUNICATION

(71) Applicant: TOYOTA MOTOR ENGINEERING & MANUFACTURING NORTH AMERICA, INC., Plano, TX (US)

(72) Inventors: Charles A. Hardin, Ann Arbor, MI (US); Ryan M. Wiesenberg, Ann Arbor, MI (US); Emily S. Lerner, Brighton, MI (US); William A. Fanelli, Ypsilanti, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 877 days.

(21) Appl. No.: 17/125,359

(22) Filed: Dec. 17, 2020

(65) Prior Publication Data

US 2022/0200701 A1 Jun. 23, 2022

(51) Int. Cl.
| | |
|---|---|
| *H04B 10/00* | (2013.01) |
| *G06V 20/54* | (2022.01) |
| *G06V 20/58* | (2022.01) |
| *G08G 1/01* | (2006.01) |
| *G08G 1/052* | (2006.01) |
| *G08G 1/056* | (2006.01) |
| *G08G 1/0967* | (2006.01) |
| *G08G 1/16* | (2006.01) |
| *H04B 10/116* | (2013.01) |
| *H04J 14/00* | (2006.01) |

(52) U.S. Cl.
CPC ........... *H04B 10/116* (2013.01); *G06V 20/54* (2022.01); *G06V 20/584* (2022.01); *G08G 1/0116* (2013.01); *G08G 1/0145* (2013.01); *G08G 1/052* (2013.01); *G08G 1/056* (2013.01); *G08G 1/096725* (2013.01); *G08G 1/096783* (2013.01); *G08G 1/161* (2013.01); *G06V 2201/08* (2022.01)

(58) Field of Classification Search
CPC ...... G08G 1/095; G08G 1/096; G08G 1/0967; G08G 1/096725
See application file for complete search history.

(56) References Cited

U.S. PATENT DOCUMENTS

| | | | |
|---|---|---|---|
| 7,973,819 B2 | 7/2011 | Shimada | |
| 9,136,945 B2 | 9/2015 | Lee et al. | |
| 9,722,701 B2 | 8/2017 | Castor et al. | |
| 10,131,365 B2 | 11/2018 | Kim et al. | |

(Continued)

FOREIGN PATENT DOCUMENTS

| | | |
|---|---|---|
| CN | 206212008 U | 5/2017 |
| JP | 2017-85230 A | 5/2017 |

*Primary Examiner* — Daniel G Dobson
(74) *Attorney, Agent, or Firm* — Oblon, McClelland, Maier & Neustadt, L.L.P.

(57) ABSTRACT

A method of determining one or more actions of a vehicle approaching an intersection having traffic lights is provided. Traffic information can be received from the traffic lights. A speed of the vehicle can be detected by a sensor. A distance between the vehicle and an intersection can be determined by processing circuitry. An amount of time for the vehicle to reach the intersection can be calculated. The traffic information with the amount of time can be compared. The one or more actions of the vehicle based on the comparison can be determined.

8 Claims, 9 Drawing Sheets

(56) References Cited

U.S. PATENT DOCUMENTS

| | | |
|---|---|---|
| 10,135,529 B2 | 11/2018 | Scheim et al. |
| 2015/0210312 A1* | 7/2015 | Stein .................... B60W 30/14 |
| | | 701/41 |
| 2018/0098215 A1 | 4/2018 | Roberts et al. |
| 2019/0052359 A1 | 2/2019 | Brady et al. |

* cited by examiner

SYSTEM AND METHOD FOR DETERMINING ACTIONS OF A VEHICLE BY VISIBLE LIGHT COMMUNICATION

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

U.S. Ser. No. 10/135,529 to Scheim et al. describes a vehicle and a method of communication for a vehicle. In particular, a visible light communication-enabled station to provide useful traffic information for a vehicle approaching an intersection is disclosed.

SUMMARY

According to an embodiment of the present disclosure, a system and a method for determining actions of a vehicle by visible light communication (VLC) are provided. The system can include cameras, sensors, interface circuitry, processing circuitry, and memory. A vehicle approaching an intersection having traffic lights can receive traffic information from traffic lights. The sensors can detect a speed of vehicle. The processing circuitry can determine a distance between the vehicle and the intersection. An amount of time can be calculated for the vehicle to reach the intersection. Traffic information with the amount of time can be compared. One or more actions of the vehicle based on comparison can be determined.

In an example, the processing circuitry determines the distance based on the traffic information, localization information, vehicle information, and timing information.

In an example, the traffic information includes at least one of stopping, going, and yielding.

In an example, the traffic lights provide localization information, the localization information including at least one of location information of the traffic lights, location information of the vehicle, and a traveling direction of the vehicle.

In an example, the traffic lights provide vehicle information, the vehicle information including at least one of a size of the vehicle, a height of the vehicle, a model of the vehicle, and a color of the vehicle.

In an example, the processing circuitry determines an accuracy of the vehicle information by comparing the vehicle information with second vehicle information detected by the sensor.

In an example, the traffic lights provide timing information, the timing information including at least one of a time required to change to a green light, a time required to change to a red light, and a time required to change to a yellow light.

In an example, the traffic lights provide a driving direction, the driving direction including at least one of turning left, turning right, and driving straight.

In an example, the one or more actions of the vehicle includes stopping, going, yielding, turning right, and turning left.

According to an embodiment of the present disclosure, a vehicle approaching an intersection including a traffic sign receives visible light information from the traffic sign. A speed of the vehicle is detected by a sensor. A distance between the vehicle and the intersection is determined by the processing circuitry. A surrounding environment of the vehicle is detected by the sensor. An amount of time for the vehicle to reach the intersection is calculated. The visible light information with the amount of time is compared. The one or more actions of the vehicles based on the comparison and the surrounding environment is determined.

In an example, the first visible light information includes first localization information and the second visible light information includes second localization information, the first localization information including first location information of the second vehicle and the second localization information including second location information of the one or more traffic infrastructures.

In an example, the determination of the yielding space further includes one or more actions of the second vehicle, the one or more actions including at least one of stopping, going, yielding, turning right, and turning left.

According to an embodiment of the present disclosure, a method of adjusting a yielding space of a first vehicle approaching a second vehicle is disclosed. The method includes receiving first visible light information of the second vehicle, receiving second visible light information of one or more traffic infrastructures, detecting, by a first sensor, a first speed of the first vehicle, detecting, by a second sensor, a second speed of the second vehicle, determining a first distance between the first vehicle and the second vehicle, determining a second distance between the first vehicle and the one or more traffic infrastructures, calculating a first amount of time for the first vehicle to reach the second vehicle based on at least one of the first speed, the second speed, and a first distance, calculating a second amount of time for the first vehicle to reach the one or more traffic infrastructures based on at least one of the first speed and the second distance, comparing the first amount of time and the second amount of time with the first visible light information and the second visible light information, and determining the yielding space between the first vehicle and the second vehicle.

In an example, the first visible light information includes first vehicle information, the first vehicle information including at least one of a size of the first vehicle, a height of the first vehicle, a model of the first vehicle, and a color of the first vehicle.

In an example, the second visible light information includes second vehicle information, the second vehicle information including at least one of a size of the second vehicle, a height of the second vehicle, a model of the second vehicle, and a color of the second vehicle.

In an example, the second visible light information includes second vehicle information, the second vehicle information including at least one of a size of the second vehicle, a height of the second vehicle, a model of the second vehicle, and a color of the second vehicle.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION

A system can include camera modules, sensors, interface circuitry, processing circuitry, and memory. A vehicle approaching an intersection having traffic lights can receive traffic information from traffic lights. The sensors can detect a speed of vehicle. The processing circuitry can determine a distance between the vehicle and the intersection. An amount of time can be calculated for the vehicle to reach the intersection. Traffic information with the amount of time can be compared. One or more actions of the vehicle based on comparison can be determined.

A vehicle approaching an intersection having a traffic sign receives visible light information from the traffic sign. A speed of the vehicle is detected by a sensor. A distance between the vehicle and the intersection is determined by the processing circuitry. A surrounding environment of the vehicle is detected by the sensor. An amount of time for the vehicle to reach the intersection is calculated. The visible light information with the amount of time is compared. The one or more actions of the vehicles based on the comparison and the surrounding environment is determined.

A method of adjusting a yielding space of a first vehicle approaching a second vehicle is disclosed. The method includes receiving first visible light information of the second vehicle, receiving second visible light information of one or more traffic infrastructures, detecting, by a first sensor, a first speed of the first vehicle, detecting, by a second sensor, a second speed of the second vehicle, determining a first distance between the first vehicle and the second vehicle, determining a second distance between the first vehicle and the one or more traffic infrastructures, calculating a first amount of time for the first vehicle to reach the second vehicle based on at least one of the first speed, the second speed, and a first distance, calculating a second amount of time for the first vehicle to reach the one or more traffic infrastructures based on at least one of the first speed and the second distance, comparing the first amount of time and the second amount of time with the first visible light information and the second visible light information, and determining the yielding space between the first vehicle and the second vehicle.

The processing circuitry can determine the distance based on the traffic information, localization information, vehicle information, and timing information. The traffic information includes stopping, going, or yielding.

The traffic light can provide localization information, the localization information including at least one of location information of the traffic light, location information of the vehicle, and a traveling direction of the vehicle.

The traffic light can provide vehicle information, the vehicle information including at least one of a size of the vehicle, a height of the vehicle, a model of the vehicle, and a color of the vehicle.

The processing circuitry can determine an accuracy of the vehicle information by comparing the vehicle information with second vehicle information detected by the sensor.

The traffic light can provide timing information, the timing information including at least one of a time required to change to a green light, a time required to change to a red light, and a time required to change to a yellow light.

The traffic light can provide a driving direction, the driving direction including at least one of turning left, turning right, and driving straight.

The one or more sensors can collect one or more pieces of information including at least one of a vehicle speed, a wheel speed, a yaw angle, a tilt angle, a compass heading, an elevation, an altitude, a LIDAR data, a sonar data, or GPS coordinates information.

In some embodiments, the sensor can collect external data, and the external data including at least one of temperature, humidity, and air quality.

The sensor can also collect road information to use. The road information can be, but are not limited to, road conditions.

In some embodiments, passengers of the vehicles can also have sensors. The sensors of the passengers may be cell phones or cameras. The sensors of the passengers can also try to communicate with the visible light on the traffic lights, traffic signs, or other vehicles.

Turning now to the figures, an exemplary system 100 is now described with reference to FIG. 1. In addition, FIGS. 2A and 2B show examples of camera modules and sensors in a vehicle according to an embodiment of the disclosure.

The system 100 can include camera modules 110, sensors 120, processing circuitry 130, memory 140, and interface circuitry 160 that are coupled together, for example, using a bus 150. In an example, such as shown in FIG. 1, the system 100 is a part of the first vehicle 101, as shown in FIGS. 2A and 2B. The first vehicle can be any suitable vehicle that can move, such as a car, a cart, a train, or the like. Alternatively, certain components (e.g., the camera modules 110 and the sensors 120) of the system 100 can be located in the first vehicle 101 and certain components (e.g., processing circuitry 130) of the system 100 can be located remotely in a server, a cloud, or the like, that can communicate with the first vehicle 101 wirelessly.

The camera modules 110 and the sensors 120 can be used to detect or communicate by one or more visible light signals in the surrounding environment. The visible light signals can be, but not limited to, visible lights from lampposts, traffic lights, traffic signs, electronic billboards, electronic guidance signs, head lights, or tail lights from other vehicles, etc.

The camera modules 110 can be any suitable devices that can obtain images or videos. The camera modules 110 can capture different views around the first vehicle 101. The camera modules 110 can be fixed to the first vehicle 101. The camera modules 110 can be detachable, for example, the camera modules 110 can be attached to, removed from, and then reattached to the first vehicle 101. The camera modules 110 can be positioned at any suitable locations of any vehicles, e.g., the first vehicle 101 in FIG. 2. The camera modules 110 can be oriented toward any suitable directions. Accordingly, the camera modules 110 can obtain images or videos to show different portions of the surrounding environment of the first vehicle 101. For example, the camera modules 110 can detect the visible light signal from the surrounding environment, as described earlier.

The camera modules 110 can also obtain images or videos to show the vehicles adjacent to the first vehicle. The camera modules 110 can obtain information and data from the images and videos that were taken by the camera modules 110. The information and data may include the one or more behaviors of the vehicles adjacent to the first vehicle.

In some embodiments, the different portions of the surrounding environment of the first vehicle 101 can include a front portion that is in front of the first vehicle 101, a rear portion that is behind the first vehicle 101, a right portion that is to the right of the first vehicle 101, a left portion that is to the left of the first vehicle 101, a bottom portion that shows an under view of the first vehicle 101, a top portion that is above the first vehicle 101, and/or the like. Accordingly, a front view, a rear view, a left view, a right view, a bottom view, and a top view can show the front portion, the rear portion, the left portion, the right portion, the bottom portion, and the top portion of the surrounding environment, respectively. For example, the bottom view can show a tire, a pothole beneath the first vehicle 101, or the like. Different portions, such as the left portion and the bottom portion, can overlap. Additional views (e.g., a right-front view, a top-left view) can be obtained by adjusting an orientation of a camera module, by combining multiple camera views, and thus show corresponding portions of the surrounding environment. An orientation of a camera module can be adjusted such that the camera module can show different portions using different orientations.

Each of the camera modules 110 can be configured to have one or more field of views (FOVs) of the surrounding environment, for example, by adjusting a focal length of the respective camera module 110 or by including multiple cameras having different FOVs in the camera module 110. Accordingly, the first camera views can include multiple FOVs of the surrounding environment.

In general, the camera modules 110 can include taking different views and/or different FOVs of the surrounding environment. In an example, the images can include the front view, the right-front view, the front bird-eye view (e.g., the front view with the bird-eye FOV), the normal left-front view (e.g., the left-front view with the normal FOV), and/or the like.

The sensors 120 can be a vehicle speed sensor, a wheel speed sensor, a compass heading sensor, an elevation sensor, a LIDAR, a sonar, a GPS location sensor, or the combination thereof. For example, a vehicle speed sensor can provide a speed data of the first vehicle 101. The GPS location sensor can provide one or more GPS coordinates on a map for the first vehicle 101. Therefore, the data collected by sensors 120 can be vehicle speed data, wheel speed data, compass heading data, elevation data, GPS location data, or the combination thereof. Thus, the visible light signal from the lampposts, traffic lights, traffic signs can be collected by the camera modules 110 and the sensors 120.

The sensors 120 can further be thermometers, humidity sensors, air quality sensors, or the combination thereof. Therefore, the data collected by the sensors 120 can further include external data such as temperature, humidity, air quality, or the combination thereof.

In an embodiment, the data collected by the cameras 110 and sensors 120 includes visible light signal data from the surrounding environment, e.g., lampposts, traffic lights, traffic signs, etc. The visible light signal data can include vehicle data and driving data such as location information or messages. The visible light signal data can be stored in visible light information database 141 in the memory 140. The program 142 in the memory 140 can analyze the database from the visible light signal data collected by cameras 110 and sensors 120.

FIGS. 2A-2B show examples of the camera modules 110 (e.g., the camera modules 110(1)-(10)) or sensors 120 (e.g., the sensors 120(1)-(10)), according to an embodiment of the disclosure. For example, the camera module 110(1) is positioned on a top side of the first vehicle 101. The camera modules 110(2)-(3) are positioned on a left side of the first vehicle 101 where the camera module 110(2) is near a front end of the first vehicle 101 and the camera module 110(3) is near a rear end of the first vehicle 101. The camera module 110(4) is positioned on the front end of the first vehicle 101 where the camera module 110(5) is positioned at the rear end of the first vehicle 101. The camera modules 110(6)-(8) are positioned on a bottom side of the first vehicle 101. The camera modules 110(9)-(10) are positioned on the left side and a right side of the first vehicle 101, respectively.

In an example, the sensor 120(1) is positioned on a top side of the first vehicle 101. The sensors 120(2)-(3) are positioned on a left side of the first vehicle 101 where the sensor 120(2) is near a front end of the first vehicle 101 and the sensor 120(3) is near a rear end of the first vehicle 101. The sensor 120(4) is positioned on the front end of the first vehicle 101 where the sensor 120(5) is positioned at the rear end of the first vehicle 101. The sensors 120(6)-(8) are positioned on a bottom side of the first vehicle 101. The sensors 120(9)-(10) are positioned on the left side and a right side of the first vehicle 101, respectively.

In an example, the camera modules 110 and the sensors 120 can be positioned together. The camera module 110(1) and the sensor 120(1) are positioned on a top side of the first vehicle 101. The camera modules 110(2)-(3) and the sensors 120(2)-(3) are positioned on a left side of the first vehicle 101 where the camera module 110(2) and the sensor 120(2) are near a front end of the first vehicle 101 and the camera module 110(3) and the sensor 110(3) are near a rear end of the first vehicle 101. The camera modules 110(4) and the sensor 110(4) are positioned on the front end of the first vehicle 101 where the camera modules 120(5) and the sensor 110(5) are positioned at the rear end of the first vehicle 101. The camera modules 110(6)-(8) and the sensors 110(6)-(8) are positioned on a bottom side of the first vehicle 101. The camera modules 110(9)-(10) and the sensors 110(9)-(10) are positioned on the left side and a right side of the first vehicle 101, respectively.

In an example, the camera module 110(4) is oriented such that the camera module 110(4) can obtain images or videos of the front portion of the surrounding environment. For example, the front portion of the surrounding environment may include visible light signal from the traffic signs or traffic lights. In addition, the sensor 120(4) may or may not be oriented such that the sensor 120(4) can detect more information such as current weather condition, temperature, visible light signals from other vehicles, or a combination thereof. For example, the visible light signals from other vehicles can be the visible light from the head lights, tail lights of the other vehicles.

The descriptions related to the camera module 110(4) and sensor 120(4) can be suitably adapted to other camera modules or sensors. For example, the camera module 110 (10) is oriented such that the camera module 110(10) can obtain images or videos of the left portion of the surrounding environment. In addition, the sensors 120(10) can or cannot be oriented such that the sensor 120(4) can detect more information such as current weather condition, temperature, sound from other vehicles, or a combination thereof.

In some embodiments, the surrounding environment of the first vehicle 101 can include road conditions, lane markers, road signs, traffic signs, objects including, for example, vehicles, pedestrians, obstacles, on or close to the roads, and the like. The surrounding environment of the first vehicle 101 can include the one or more behaviors of the vehicles, e.g., acceleration or deceleration. The one or more behaviors can include changes in vehicle speed, changes in lane position, driver head orientation, driver head movement, and location of hands of the drivers on a steering wheel of the one or more vehicles. The camera modules 110 can capture visible light signals from traffic signs and/or road signs.

The interface circuitry 160 can be configured to communicate with any suitable device of the first vehicle 101 using any suitable devices and/or communication technologies, such as wired, wireless, fiber optic communication technologies, and any suitable combination thereof. The interface circuitry 160 can also communicate with the visible light sources using the visible light signals, e.g., visible lights from lampposts, traffic lights, or traffic signs. The interface circuitry 160 can include wireless communication circuitry 165 that is configured to receive and transmit data wirelessly from servers (e.g., a dedicated server, a cloud including multiple servers), vehicles (e.g., using vehicle-to-vehicle (V2V) communication), infrastructures (e.g., using vehicle-to-infrastructure (V2I) communication), one or more third-parties (e.g., a municipality), map data services (e.g., Google Maps, Waze, Apple Maps), and/or the like. In an example, the wireless communication circuitry 165 can communicate with mobile devices including a mobile phone via any suitable wireless technologies such as IEEE 802.15.1 or Bluetooth. In an example, the wireless communication circuitry 165 can use wireless technologies, such as IEEE 802.15.1 or Bluetooth, IEEE 802.11 or Wi-Fi, mobile network technologies including such as global system for mobile communication (GSM), universal mobile telecommunications system (UMTS), long-term evolution (LTE), fifth generation mobile network technology (5G) including ultra-reliable and low latency communication (URLLC), and the like.

The interface circuitry 160 can include any suitable individual device or any suitable integration of multiple devices such as touch screens, keyboards, keypads, a mouse, joysticks, microphones, universal series bus (USB) interfaces, optical disk drives, display devices, audio devices (e.g., speakers), and the like. The interface circuitry may include a display device. The display device can be configured to display images/videos captured by one of the camera modules 110.

The interface circuitry 160 can also include a controller that converts data into electrical signals and sends the electrical signals to the processing circuitry 130. The interface circuitry 160 can also include a controller that converts electrical signals from the processing circuitry 130 to the data, such as visual signals including text messages used by a display device, audio signals used by a speaker, and the like. For example, the interface circuitry 160 can be configured to output an image on an interactive screen and to receive data generated by a stylus interacting with the interactive screen.

The interface circuitry 160 can be configured to output data, such as visible light signal data from the camera modules 110 and the sensors 120 determined by the processing circuitry 130, to the user of the first vehicle 101, and the like.

The interface circuitry 160 can be configured to receive data, such as the visible light signal data described above. The visible light signal data can be vehicle data including or indicating driving scenarios and/or vehicle characteristics for the vehicle by the respective camera modules 110 or sensors 120 such as times, locations, vehicle types, and/or like. The visible light signal data can include driving data indicating which lane that the vehicle is currently driving, head of the vehicle, etc.

The interface circuitry 160 can be configured to receive global positioning system (GPS) data of the first vehicle 101. In an example, the interface circuitry 160 can receive positioning information from various satellite-based positioning systems such as a global positioning system (GPS), and determine a position of the first vehicle 101. In some examples, the position can be a physical address, the latitude and longitude coordinates of a geographic coordinate system used by satellite-based positioning systems such as a GPS, and the like.

The processing circuitry 130 can obtain the visible light signal data directly or can extract the visible light signal data from images, videos, or the like. In an example, the processing circuitry 130 receives images from the first vehicle which receives the visible light signal from the lampposts, traffic lights, or traffic signs. The images can show a portion of a surrounding environment of the first vehicle. The processing circuitry 130 can extract visible light signal information based on the images. For example, the processing circuitry 130 can extract the vehicle information from the visible light signal information such as vehicle type, vehicle color, and vehicle manufacturer of the vehicles based on the received images.

Figure 1:
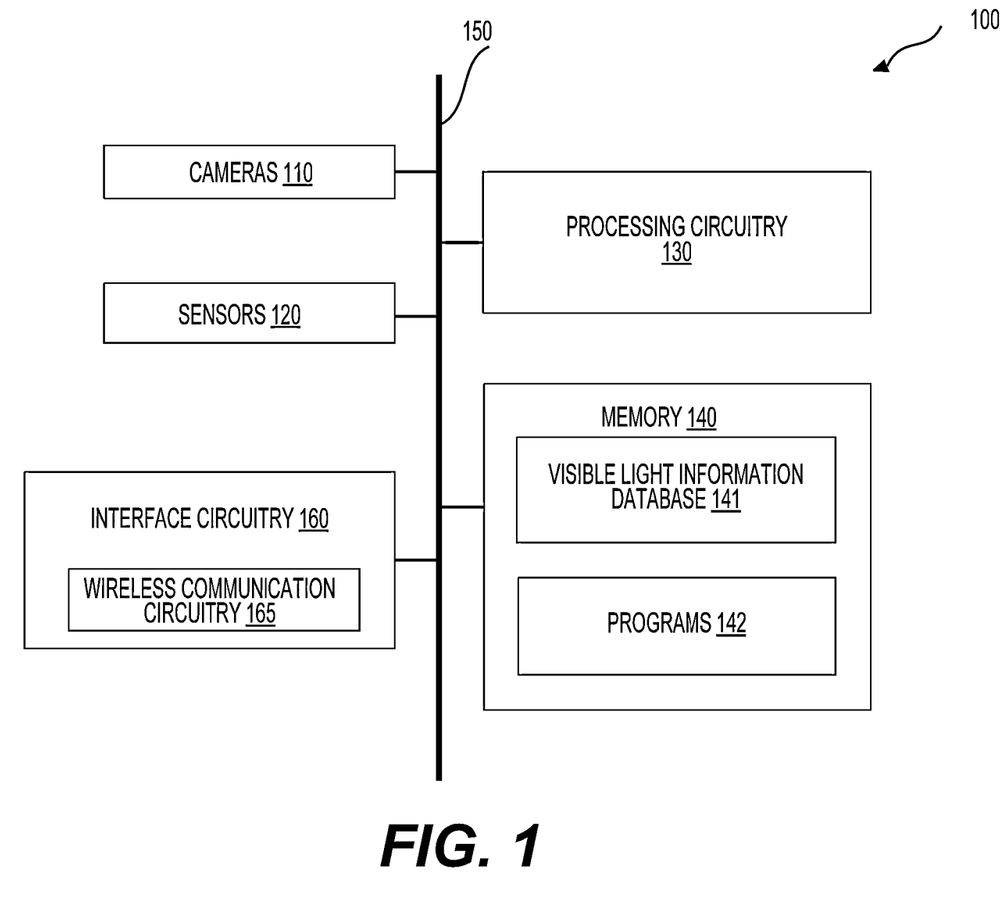
FIG. 1 is a schematic of an exemplary system according to an embodiment of the disclosure.
Figure 2A:
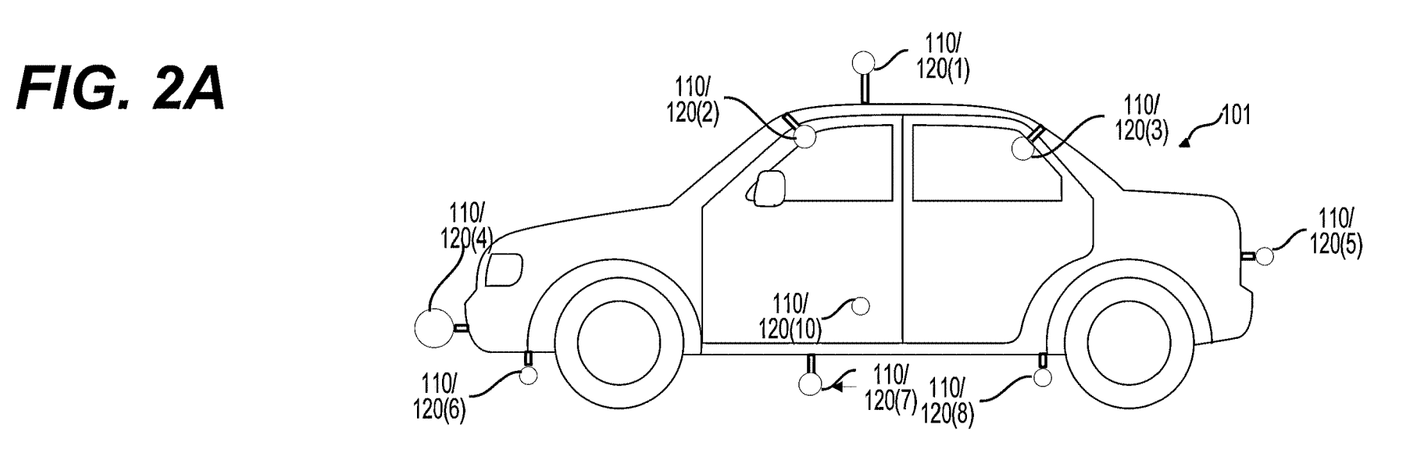
FIGS. 2A-2B show examples of camera modules and sensors in a vehicle according to an embodiment of the disclosure.
Figure 2B:
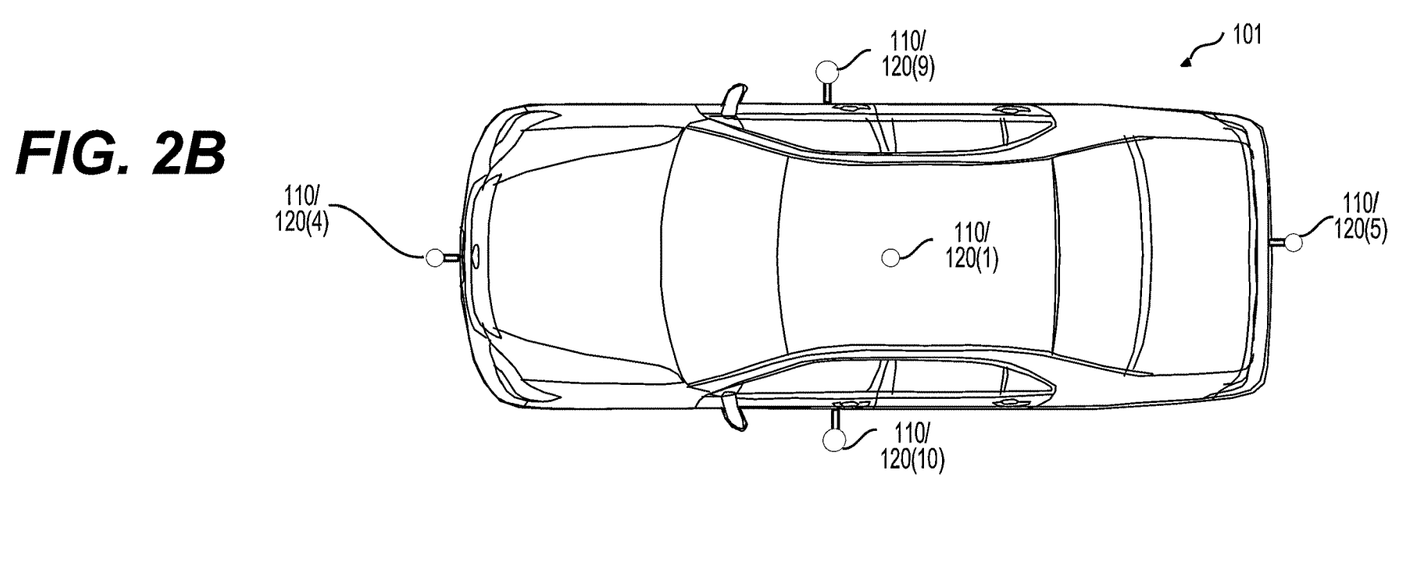

In an example shown in FIG. 1, the processing circuitry 130 is part of the first vehicle 101. In an example, the processing circuitry 130 can be implemented in a server, a cloud, or the like, that is remote from the first vehicle 101. The server, the cloud, or the like can communicate wirelessly with the first vehicle 101 regarding the reconstruction, the visible light signal data, or the like.

The memory 140 is configured to store visible light signal data in the visible light information database 141. The memory 140 is also configured to include programs 142. In an embodiment, information in the memory 140 can be modified or updated by the processing circuitry 130. The modified information can also be uploaded to a cloud services platform that can provide on-demand delivery of computing power, database storage, and IT resources or shared with other vehicles, for example, using the wireless communication circuitry 165 via V2I and V2V communications, respectively.

The memory 140 can be a non-volatile storage medium. In another embodiment, the memory 140 includes both non-volatile and volatile storage media. In one embodiment, a portion of the memory 140 can be integrated into the processing circuitry 130. The memory 140 can be located remotely and communicate with the processing circuitry 130 via a wireless communication standard using the wireless communication circuitry 165.

In an embodiment, in the FIG. 1, for example, the components are coupled together by a bus architecture including a bus 150. Other suitable interconnection techniques can also be used.

One or more components of the interface circuitry 160, the processing circuitry 130, and the memory 140 can be made by discrete devices or integrated devices. The circuits for one or more of the interface circuitry 160, the processing circuitry 130, and the memory 140 can be made by discrete circuits, one or more integrated circuits, application-specific integrated circuits (ASICs), and the like. The processing circuitry 130 can also include one or more central processing units (CPUs), one or more graphic processing units (GPUs), dedicated hardware or processors to implement neural networks, and the like.

Figure 3:
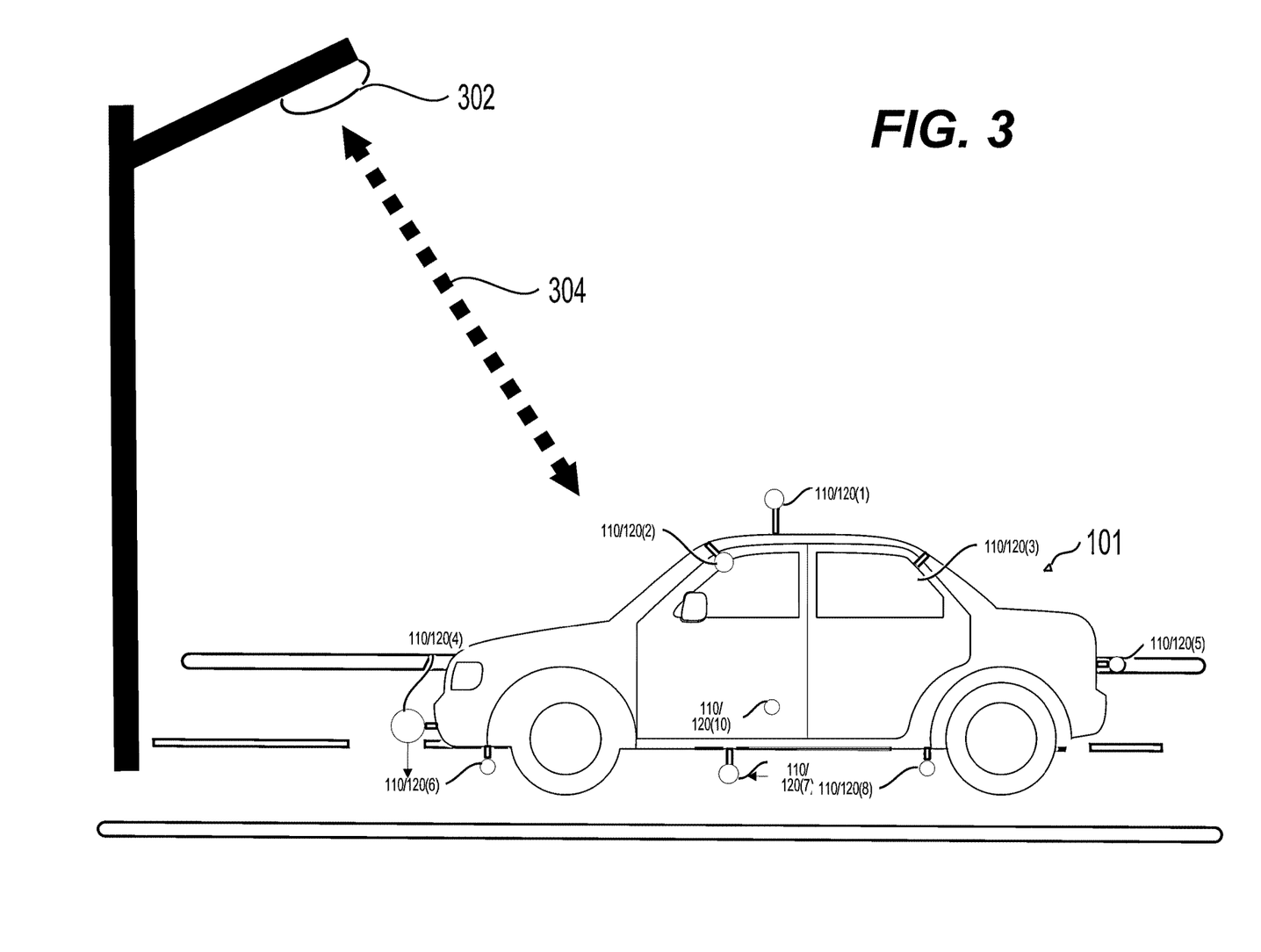
FIG. 3 is a visible light signal communication between a lamppost and a vehicle according to an embodiment of the disclosure.

According to an embodiment, and with reference to FIG. 3, a visible light signal communication between a lamppost and a vehicle is presented.

In an embodiment, the camera modules 110 and the sensors 120 in the vehicle 101 can capture visible light signals 304 of the lamppost 302. The lamppost 302 can include sensors and cameras to detect any vehicles surrounding the lamppost 302.

The processing circuitry of the vehicle 101 analyzes the visible light signal 304 to extract information such as traffic information, localization information, vehicle information, and timing information. The traffic information includes at least one of stopping, going, and yielding. The localization information includes location information of the traffic light, location information of the vehicle, and a traveling direction of the vehicle. The vehicle information includes size of the vehicle, height of the vehicle, vehicle model, and color of the vehicle.

The processing circuitry of the vehicle 101 of the vehicle 101 can determine an accuracy of the vehicle information by comparing the vehicle information with second vehicle information detected by one or more in-vehicle sensors. The vehicle information can include size of the vehicle, height of the vehicle, or the distance between the vehicle and the lamppost.

The visible light signal information 304 can be frequency-based information, or voltage-based information, or the like. For example, a first frequency of the visible light can be used for storing first information, e.g., the vehicle size, and a second frequency of the visible light can be used for storing second information, e.g., the vehicle color.

Figure 4:
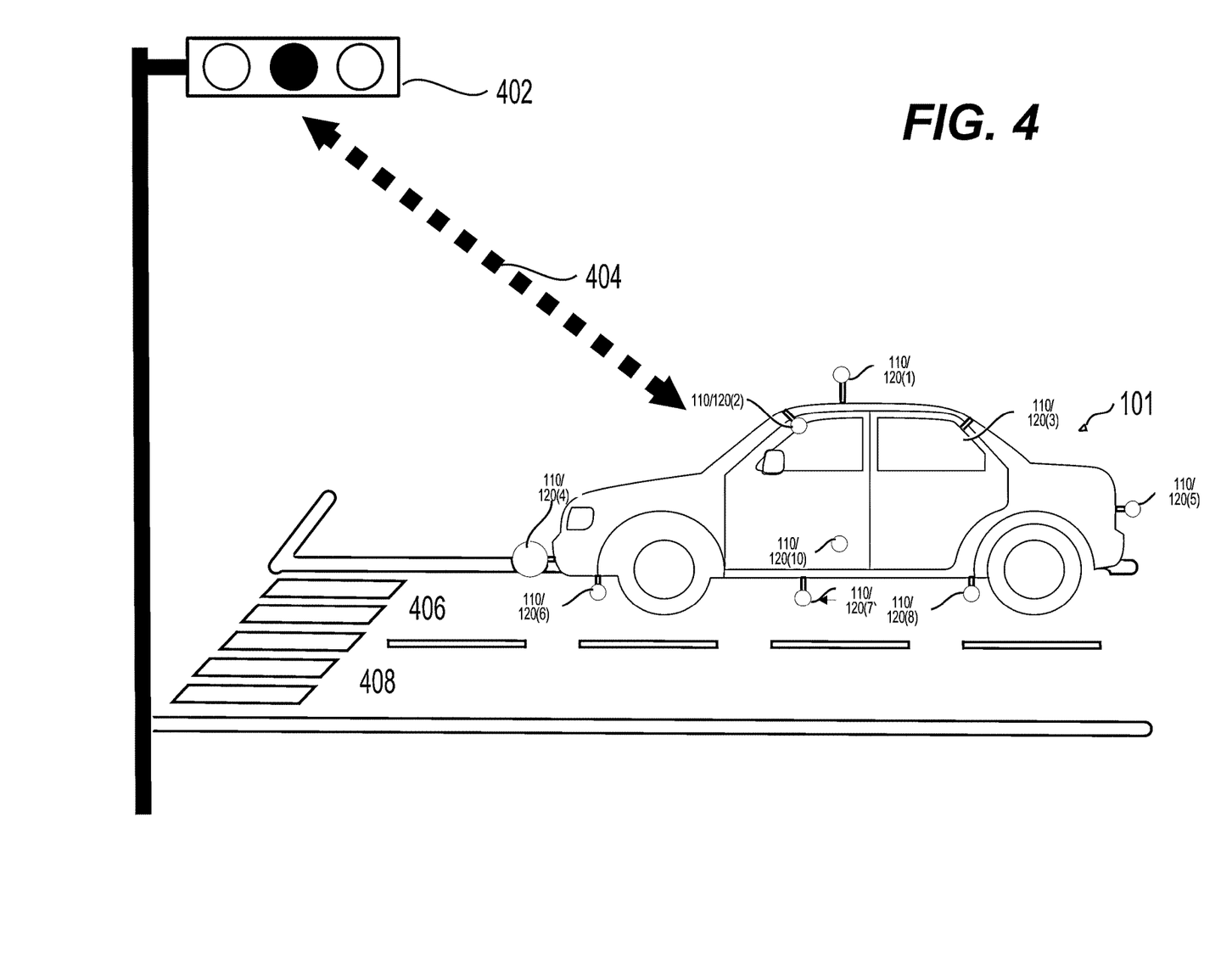
FIG. 4 is a visible light signal communication between a traffic light and a vehicle according to an embodiment of the disclosure.

According to an embodiment, and with reference to FIG. 4, a visible light signal communication between a traffic light and a vehicle is presented.

As described above, in an embodiment, the camera modules 110 and the sensors 120 in the vehicle 101 can capture visible light signals 404 of the traffic light 402. The traffic light 402 can include sensors and cameras to detect any vehicles surrounding the traffic light 402.

The processing circuitry of the vehicle 101 analyzes the visible light signal 404 to extract information such as traffic information, localization information, vehicle information, and timing information. The traffic information includes at least one of stopping, going, and yielding. The localization information includes location information of the traffic light, location information of the vehicle, and a traveling direction of the vehicle. The vehicle information includes size of the vehicle, height of the vehicle, vehicle model, and color of the vehicle.

The timing information can include a time to a green light, a time to a yellow light, and a time to a red light of the traffic light.

In some embodiment, the visible light signal information can include information about which lane that the vehicle 101 is currently driving, e.g., the vehicle 101 is currently driving on lane 406.

The processing circuitry of the vehicle 101 of the vehicle 101 can determine an accuracy of the vehicle information by comparing the vehicle information with second vehicle information detected by one or more in-vehicle sensors 120.

As described above, the visible light signal information 404 can be frequency-based information, or voltage-based information, or the like. For example, a first frequency of the visible light can be used for storing first information, e.g., the vehicle size, and a second frequency of the visible light can be used for storing second information, e.g., the vehicle color.

Figure 5:
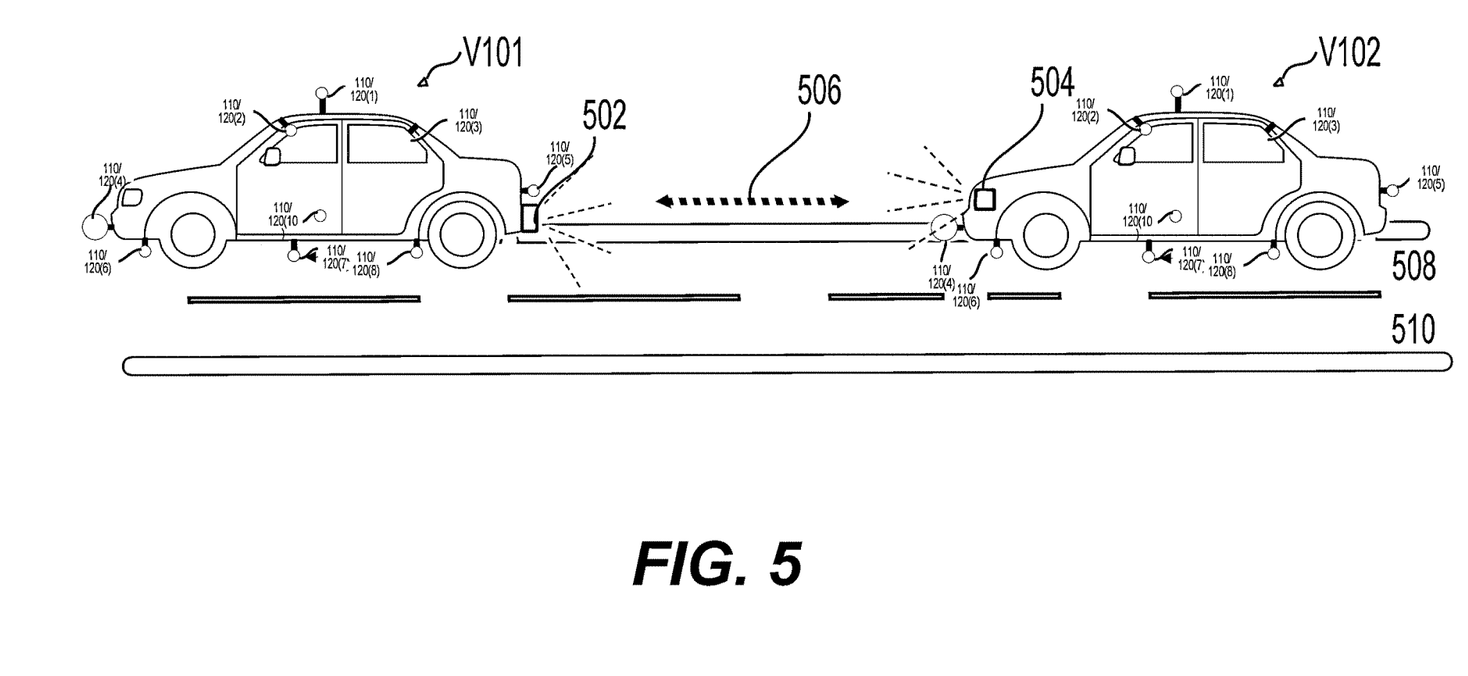
FIG. 5 is a visible light signal communication between two vehicles according to an embodiment of the disclosure.

According to an embodiment, and with reference to FIG. 5, a visible light signal communication between two vehicles is presented.

As described above, in an embodiment, the camera modules 110 and the sensors 120 in the vehicles V101 and V102 can capture visible light signals 506 of the tail light 502 in the vehicle V101 and the head light 504 in the vehicle V102.

The processing circuitry of the vehicle V101 can analyze the visible light signal 506 to extract information such as traffic information, localization information, vehicle information, and timing information. The traffic information includes at least one of stopping, going, and yielding. The localization information includes location information of the traffic light, location information of the vehicle, and a traveling direction of the vehicle. The vehicle information includes size of the vehicle, height of the vehicle, vehicle model, and color of the vehicle.

The processing circuitry of the vehicle V102 can also analyze the visible light signal 506 to extract information such as traffic information, localization information, vehicle information, and timing information. The traffic information includes at least one of stopping, going, and yielding. The localization information includes location information of the traffic light, location information of the vehicle, and a traveling direction of the vehicle.

The vehicle information includes at least one of a size of the vehicle, a height of the vehicle, a model of the vehicle, a color of the vehicle, a heading of the vehicle, an owner of the vehicle, a number of the passengers in the vehicle, a destination of the vehicle, a number of vehicles ahead, a number of the vehicles nearby, an early warning of emergency services, and information of braking and suspension of the vehicles.

In some embodiments, the visible light signal information can include an intention of a driving direction of the vehicles. For example, the visible light signal information can include a direction of the vehicle if the driver does not use the signal to provide the driving direction for other vehicles.

In some embodiment, the visible light signal information can include information about which lane that the vehicle V101 or vehicle V102 is currently driving, e.g., the vehicle V101 is currently driving on lane 508.

In some embodiments, if two or more head lights or tail lights are presented in these two vehicles, vehicle pose estimation can be used. The vehicle pose estimation can include vehicle rotation or positions of these two vehicles. The estimation can be performed by calculating the distance between two lights, a dimension of the lights and the position of the lights.

As described above, the visible light signal information 506 can be frequency-based information, or voltage-based information, or the like. For example, a first frequency of the visible light can be used for storing first information, e.g., the vehicle size, and a second frequency of the visible light can be used for storing second information, e.g., the vehicle color.

Figure 6:
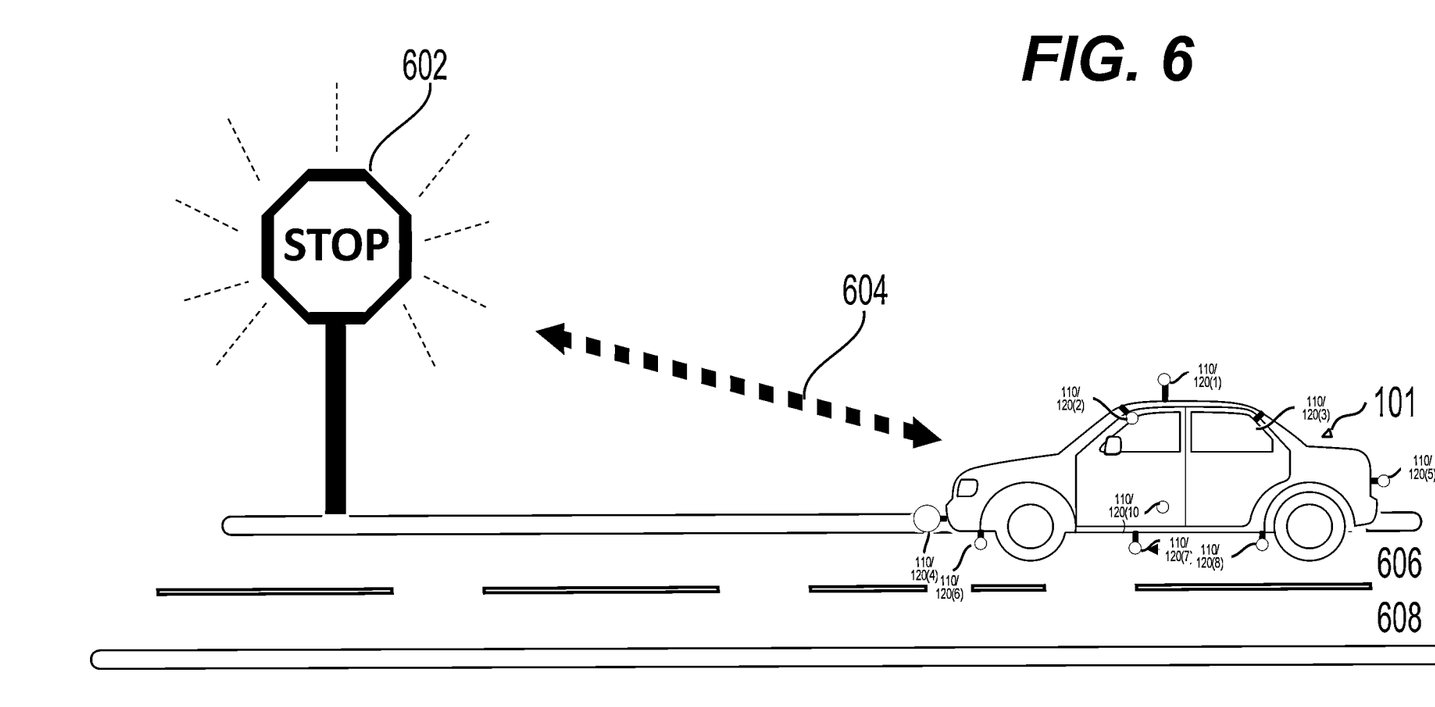
FIG. 6 is a visible light signal communication between a vehicle and a traffic sign according to an embodiment of the disclosure.

According to an embodiment, and with reference to FIG. 6, a visible light signal communication between a vehicle and a traffic sign is presented.

As described above, in an embodiment, the camera modules 110 and the sensors 120 in the vehicle 101 can capture visible light signal 604 of the traffic sign 602. The traffic sign 602 can be a stop sign, a yield sign, etc.

The processing circuitry of the vehicle 101 can analyze the visible light signal 604 to extract information such as traffic information, localization information, vehicle information, and timing information. The traffic information includes at least one of stopping, going, and yielding. The localization information includes location information of the traffic light, location information of the vehicle, and a traveling direction of the vehicle. The vehicle information includes size of the vehicle, height of the vehicle, vehicle model, and color of the vehicle.

In some embodiment, the visible light signal information can include information about which lane that the vehicle 101 is currently driving, e.g., the vehicle 101 is currently driving on lane 606.

In some embodiments, the visible light signal information can include encoding the signal to help to provide additional information in a map and potential destination for an off-ramp.

In some embodiments, if a construction sign is used, the visible light signal information can provide information for the vehicle receiving the signal that a construction work is present or a speed limit during the construction.

As described above, the visible light signal information 604 can be frequency-based information, or voltage-based information, or the like. For example, a first frequency of the visible light can be used for storing first information, e.g., the vehicle size, and a second frequency of the visible light can be used for storing second information, e.g., the vehicle color.

Figure 7:
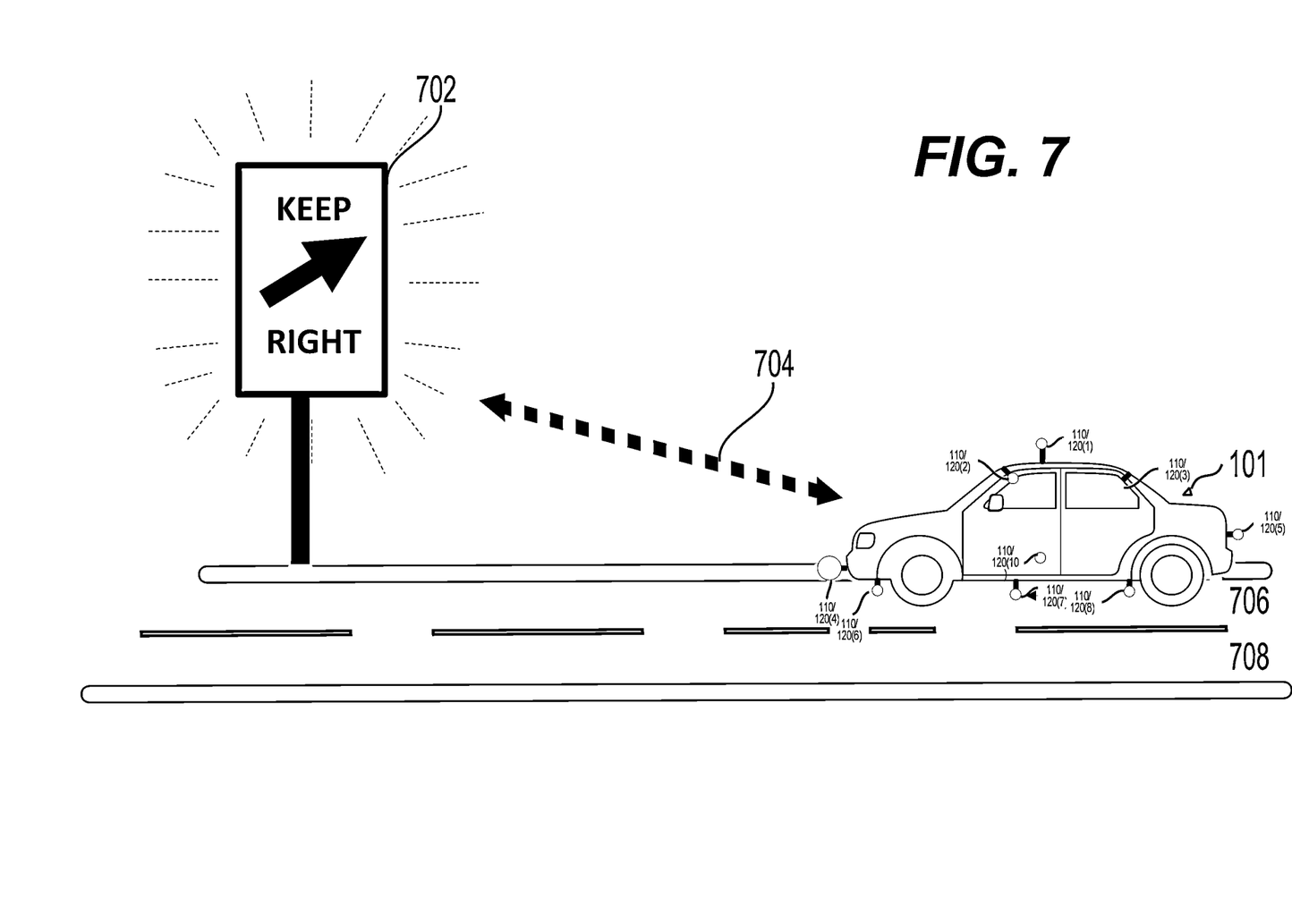
FIG. 7 is a visible light signal communication between a vehicle and a traffic guidance sign according to an embodiment of the disclosure.

According to an embodiment, and with reference to FIG. 7, a visible light signal communication between a vehicle and a traffic guidance sign is presented.

As described above, in an embodiment, the camera modules 110 and the sensors 120 in the vehicle 101 can capture visible light signal 704 of the traffic guidance sign 702. The traffic guidance sign 702 can provide guidance such as keeping right, keeping left, etc.

The processing circuitry of the vehicle 101 can analyze the visible light signal 704 to extract information such as traffic information, localization information, vehicle information, and timing information. The traffic information includes at least one of stopping, going, and yielding. The localization information includes location information of the traffic light, location information of the vehicle, and a traveling direction of the vehicle. The vehicle information includes at least one of a size of the vehicle, a height of the vehicle, a model of the vehicle, and a color of the vehicle.

In some embodiment, the visible light signal information can include information about which lane that the vehicle 101 is currently driving, e.g., the vehicle 101 is currently driving on lane 706.

As described above, the visible light signal information 704 can be frequency-based information, or voltage-based information, or the like. For example, a first frequency of the visible light can be used for storing first information, e.g., the vehicle size, and a second frequency of the visible light can be used for storing second information, e.g., the vehicle color.

Figure 8:
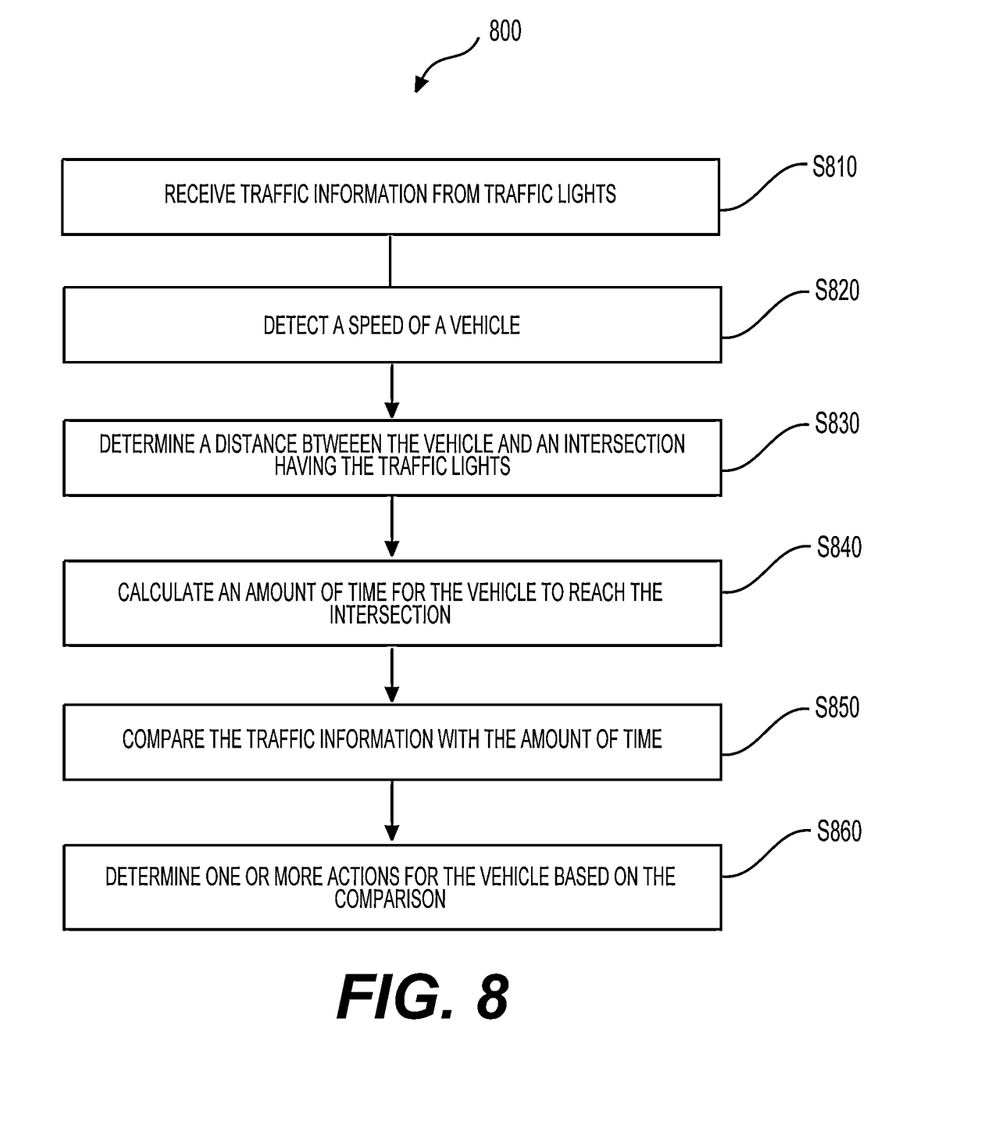
FIG. 8 is a flowchart outlining an exemplary process according to an embodiment of the disclosure.

According to an embodiment, and with reference to FIG. 8, a flowchart outlining an exemplary process 800 is presented.

In an embodiment, the process 800 can be implemented using the system 100 described in FIG. 1. In an embodiment, the process 800 can be used to determine one or more actions for a vehicle. For purposes of brevity, descriptions are given for the first vehicle 101, and the descriptions can be suitably adapted to any suitable vehicle. As described above, the first vehicle 101 can include the camera modules 110 and the sensors 120 configured to have first vehicle data. The traffic lights can also include sensors and camera modules. The traffic information can include data from the camera modules 110 and data from the sensors 120 from the traffic lights or the first vehicle 101. The process 800 starts at S810 and proceeds to S860.

At S810, the first vehicle 101 receives traffic information from traffic lights. The traffic information can be in a visible light signal from the traffic lights.

At S820, a speed of the first vehicle 101 is detected. The detection of the speed of the first vehicle 101 can be from a speed sensor from the first vehicle 101 or from a speed sensor from the traffic lights in S810.

At S830, a distance is determined between the first vehicle 101 and an intersection having the traffic lights. The distance can be determined by the processing circuitry in the first vehicle 101 or the processing circuitry in the traffic lights. The determination can be based on visible light signal information communicating between the traffic lights and the first vehicle 101.

At S840, an amount of time for the vehicle to reach the intersection is calculated. The calculation can be performed by the processing circuitry of the first vehicle 101 or the traffic lights.

At S850, the traffic information with the amount of time for the vehicle to reach the intersection is compared. The comparison can also be performed by the processing circuitry.

At S860, the one or more actions for the first vehicle 101 can be determined based on the comparison. The one or more actions can be stopping, going, yielding, turning right, and turning left. For example, the first vehicle 101 can continue to turn right if the processing circuitry determines that the distance is large enough for the first vehicle 101 to turn right.

Different vehicles and traffic lights can have different visible light signal information in the respective vehicles or traffic lights. The process 800 can be adapted by different vehicle type and different vehicle condition. The process 800 can also be adapted by different traffic lights.

Figure 9:
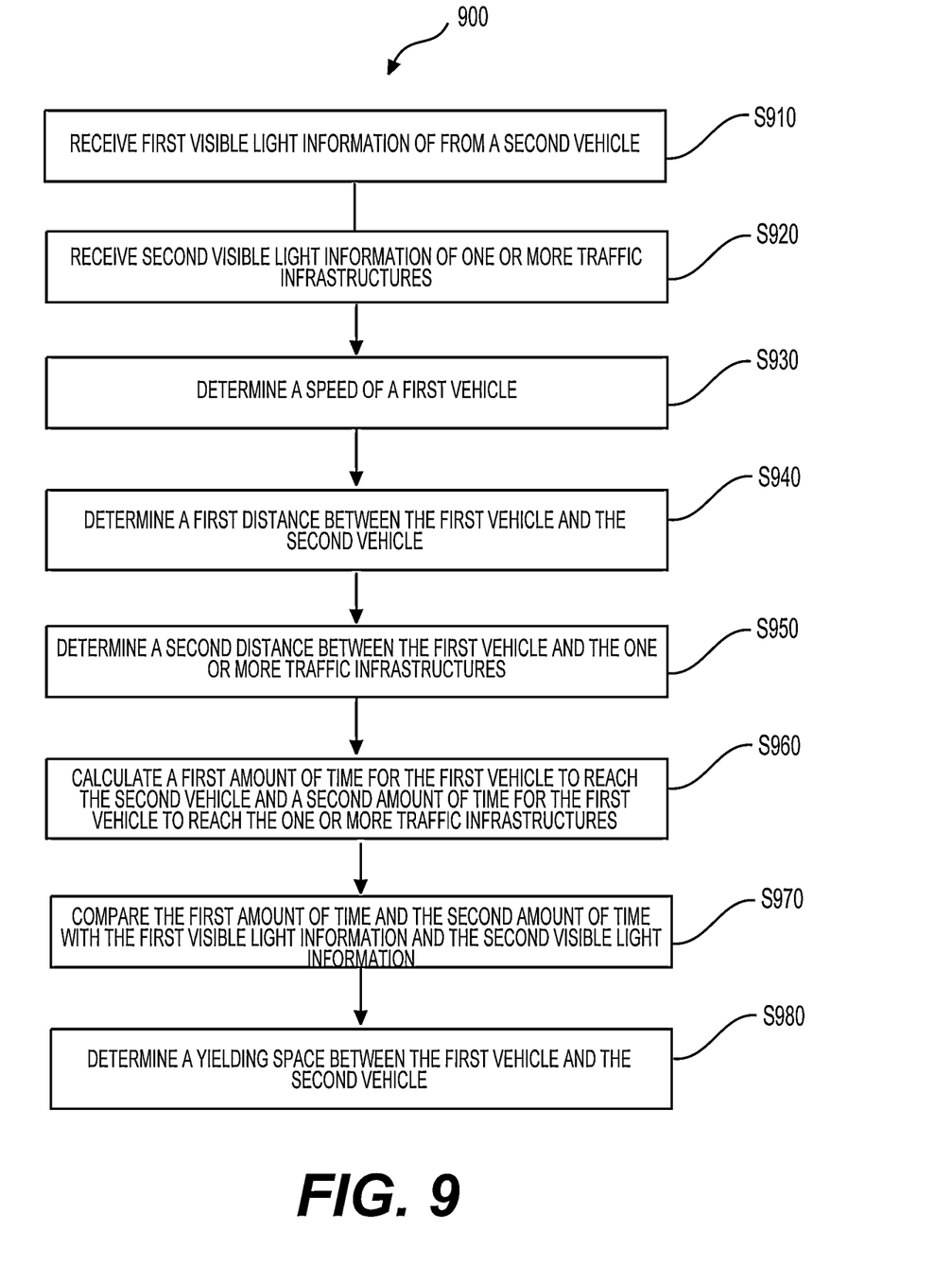
FIG. 9 is a flowchart outlining an exemplary process according to an embodiment of the disclosure.

According to an embodiment, and with reference to FIG. 9, a flowchart outlining an exemplary process 900 is presented.

In an embodiment, the process 900 can be implemented using the system 100 described in FIG. 1. In an embodiment, the process 900 can be used to determine one or more actions for a vehicle. For purposes of brevity, descriptions are given for the first vehicle 101, and the descriptions can be suitably adapted to any suitable vehicle. As described above, the first vehicle 101 can include the camera modules 110 and the sensors 120 configured to have first vehicle data. The traffic lights can also include sensors and camera modules. The traffic information can include data from the camera modules 110 and data from the sensors 120 from the traffic lights or the first vehicle 101. The process 900 starts at S910 and proceeds to S980.

At S910, the first vehicle 101 receives first visible light information from a second vehicle. The first visible light information can be from the head lights or tail lights from a second vehicle.

At S920, the first vehicle 101 receives second visible light information from one or more traffic infrastructures. The second visible light information can be from a lamp post, traffic signs, traffic lights, etc.

At S930, a speed of the first vehicle 101 is detected. The detection of the speed of the first vehicle 101 can be from a speed sensor from the first vehicle 101, the second vehicle, or from a speed sensor from the one or more traffic infrastructures in S920.

At S940, a first distance is determined between the first vehicle 101 and the second vehicle. The distance can be determined by the processing circuitry in the first vehicle 101 or the processing circuitry in the second vehicle. The determination can be based on visible light signal information communicating between the first vehicle and the second vehicle.

At S950, a second distance is determined between the first vehicle 101 and the one or more traffic infrastructures. The distance can be determined by the processing circuitry in the first vehicle 101 or the processing circuitry in the one or more traffic infrastructures. The determination can be based on visible light signal information communicating between the first vehicle and the one or more traffic infrastructures.

At S960, a first amount of time for the first vehicle to reach the second vehicle is calculated. A second amount of time for the second vehicle to reach the one or more traffic infrastructures is calculated. The calculations can be performed by the processing circuitry of the first vehicle 101, the second vehicle, or the one or more traffic infrastructures.

At S970, the first amount of time and the second amount of time with the first visible light information and the second visible light information are compared. The comparison can also be performed by the processing circuitry.

At S980, a yielding space between the first vehicle 101 and the second vehicle can be determined based on the comparison.

Different vehicles and one or more traffic infrastructures can have different visible light signal information in the respective vehicles or traffic lights. The process 900 can be adapted by different vehicle type and different vehicle condition. The process 900 can also be adapted by different one or more traffic infrastructures.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method of determining one or more actions of a vehicle approaching an intersection including traffic lights, comprising:
receiving traffic information from the traffic lights;
detecting, by a sensor, a speed of the vehicle;
determining, by processing circuitry, a distance between the vehicle and the intersection;
calculating an amount of time for the vehicle to reach the intersection;
comparing the traffic information with the amount of time; and
determining the one or more actions of the vehicle based on the comparison,
wherein the processing circuitry determines the distance based on the traffic information and at least one of localization information, vehicle information, and timing information.

2. The method of claim 1, wherein the traffic information includes at least one of stopping, going, and yielding.

3. The method of claim 1, wherein the traffic lights provide localization information, the localization information including at least one of location information of the traffic lights, location information of the vehicle, and a traveling direction of the vehicle.

4. The method of claim 1, wherein the traffic lights provide vehicle information, the vehicle information including at least one of a size of the vehicle, a height of the vehicle, a model of the vehicle, and a color of the vehicle.

5. The method of claim 4, wherein the processing circuitry determines an accuracy of the vehicle information by comparing the vehicle information with second vehicle information detected by the sensor.

6. The method of claim 1, wherein the traffic lights provide timing information, the timing information including at least one of a time required to change to a green light, a time required to change to a red light, and a time required to change to a yellow light.

7. The method of claim 1, wherein the traffic lights provide a driving direction, the driving direction including at least one of turning left, turning right, and driving straight.

8. The method of claim 1, wherein the one or more actions of the vehicle includes stopping, going, yielding, turning right, and turning left.

* * * * *